United States Patent
Valeri et al.

(10) Patent No.: US 10,052,969 B2
(45) Date of Patent: Aug. 21, 2018

(54) METHOD AND APPARATUS FOR OPERATING A VEHICLE EMPLOYING NON-COMBUSTION TORQUE MACHINE

(71) Applicant: GM GLOBAL TECHNOLOGY OPERATIONS LLC, Detroit, MI (US)

(72) Inventors: Frank C. Valeri, Novi, MI (US); Ian R. Singer, Macomb, MI (US); John P. Miller, Howell, MI (US); Tim M. Grewe, Northville, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 256 days.

(21) Appl. No.: 15/014,558

(22) Filed: Feb. 3, 2016

(65) Prior Publication Data
US 2017/0217331 A1  Aug. 3, 2017

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 17/00* | (2006.01) | |
| *G06F 7/00* | (2006.01) | |
| *B60L 15/02* | (2006.01) | |
| *B60L 11/18* | (2006.01) | |

(Continued)

(52) U.S. Cl.
CPC ........... *B60L 15/02* (2013.01); *B60L 11/1803* (2013.01); *B60L 15/20* (2013.01); *B60Q 5/008* (2013.01); *B60L 2210/40* (2013.01); *B60L 2240/12* (2013.01); *B60L 2240/526* (2013.01); *B60L 2240/529* (2013.01); *B60L 2270/42* (2013.01); *Y02T 10/645* (2013.01); *Y02T 10/7005* (2013.01); *Y02T 10/7241* (2013.01); *Y02T 10/7275* (2013.01)

(58) Field of Classification Search
CPC ...... B60L 15/02; B60L 11/1803; B60L 15/20; B60L 2210/40; H02P 7/285
USPC ............................................ 701/22; 388/820
See application file for complete search history.

(56) References Cited

U.S. PATENT DOCUMENTS

| | | |
|---|---|---|
| 7,768,220 B2 | 8/2010 | Schulz et al. |
| 7,952,308 B2 | 5/2011 | Schulz et al. |

(Continued)

OTHER PUBLICATIONS

English Translation of KR1020150155930A1.*
Shepardson; "U.S will finalize long-delayed "quiet car" rules"; Detroit News Washington Bureau; Jul. 29, 2015.

*Primary Examiner* — Mahmoud S Ismail
(74) *Attorney, Agent, or Firm* — Quinn IP Law (57) ABSTRACT

A vehicle including a powertrain system that includes an electric machine electrically connected to a power inverter is described, wherein the powertrain system is operative in an electric vehicle mode to generate propulsion torque. A method for controlling the powertrain system includes determining a vehicle speed, and determining a preferred audible sound to be generated by the powertrain system when operating in the electric vehicle mode at the vehicle speed. A control signal for the power inverter is determined, and is associated with operating the powertrain system in the electric vehicle mode at the vehicle speed. The preferred audible sound is incorporated into the control signal for the power inverter, and the power inverter is controlled to operate the electric machine employing the control signal and the preferred audible sound.

11 Claims, 3 Drawing Sheets

(51) Int. Cl.
  *B60Q 5/00* (2006.01)
  *B60L 15/20* (2006.01)
  *H02P 7/285* (2016.01)
  *H03D 13/00* (2006.01)

(56) References Cited

U.S. PATENT DOCUMENTS

| | | |
|---|---|---|
| 8,860,381 B2 | 10/2014 | Holliday |
| 2008/0298785 A1* | 12/2008 | Patel ..................... H02M 1/14 |
| | | 388/820 |
| 2011/0290573 A1* | 12/2011 | Hanada ................. B60K 6/445 |
| | | 180/65.285 |
| 2012/0179280 A1 | 7/2012 | Faye |
| 2012/0306422 A1 | 12/2012 | Hao et al. |
| 2014/0210216 A1* | 7/2014 | Konishi ................... B60K 6/48 |
| | | 290/38 R |
| 2017/0130625 A1* | 5/2017 | Jung ........................ F01N 9/00 |

\* cited by examiner

METHOD AND APPARATUS FOR OPERATING A VEHICLE EMPLOYING NON-COMBUSTION TORQUE MACHINE

TECHNICAL FIELD

The present disclosure relates to vehicles employing non-combustion torque machines, and control thereof.

BACKGROUND

A vehicle operating in an electric vehicle mode may emit less audible noise than a vehicle employing an internal combustion engine for propulsion power. Noise emission from a vehicle may serve to audibly locate the vehicle, and provide information about the vehicle's acceleration, deceleration, and/or direction of travel.

SUMMARY

A vehicle including a powertrain system that includes an electric machine electrically connected to a power inverter is described, wherein the powertrain system is operative in an electric vehicle mode to generate propulsion torque. A method for controlling the powertrain system includes determining a vehicle speed, and determining a preferred audible sound to be generated by the powertrain system when operating in the electric vehicle mode at the vehicle speed. A control signal for the power inverter is determined, and is associated with operating the powertrain system in the electric vehicle mode at the vehicle speed. The preferred audible sound is incorporated into the control signal for the power inverter, and the power inverter is controlled to operate the electric machine employing the control signal and the preferred audible sound.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 4-1 graphically shows an example of characteristic operation of an electric motor supplying propulsion torque on a vehicle, including a PWM switching frequency for control the electric motor in relation to vehicle speed, in accordance with the disclosure;

FIG. 4-2 graphically shows characteristic operation of the electric motor of FIG. 4-1 in context of a select switching frequency and an associated sound pressure level (SPL), in accordance with the disclosure; and FIG. 4-3 graphically shows characteristic operation of the electric motor of FIG. 4-1 in context of a select switching frequency and an associated sound pressure level (SPL), wherein dithering of the switch frequency is applied to achieve a target sound in accordance with the disclosure.

DETAILED DESCRIPTION

Figure 1:
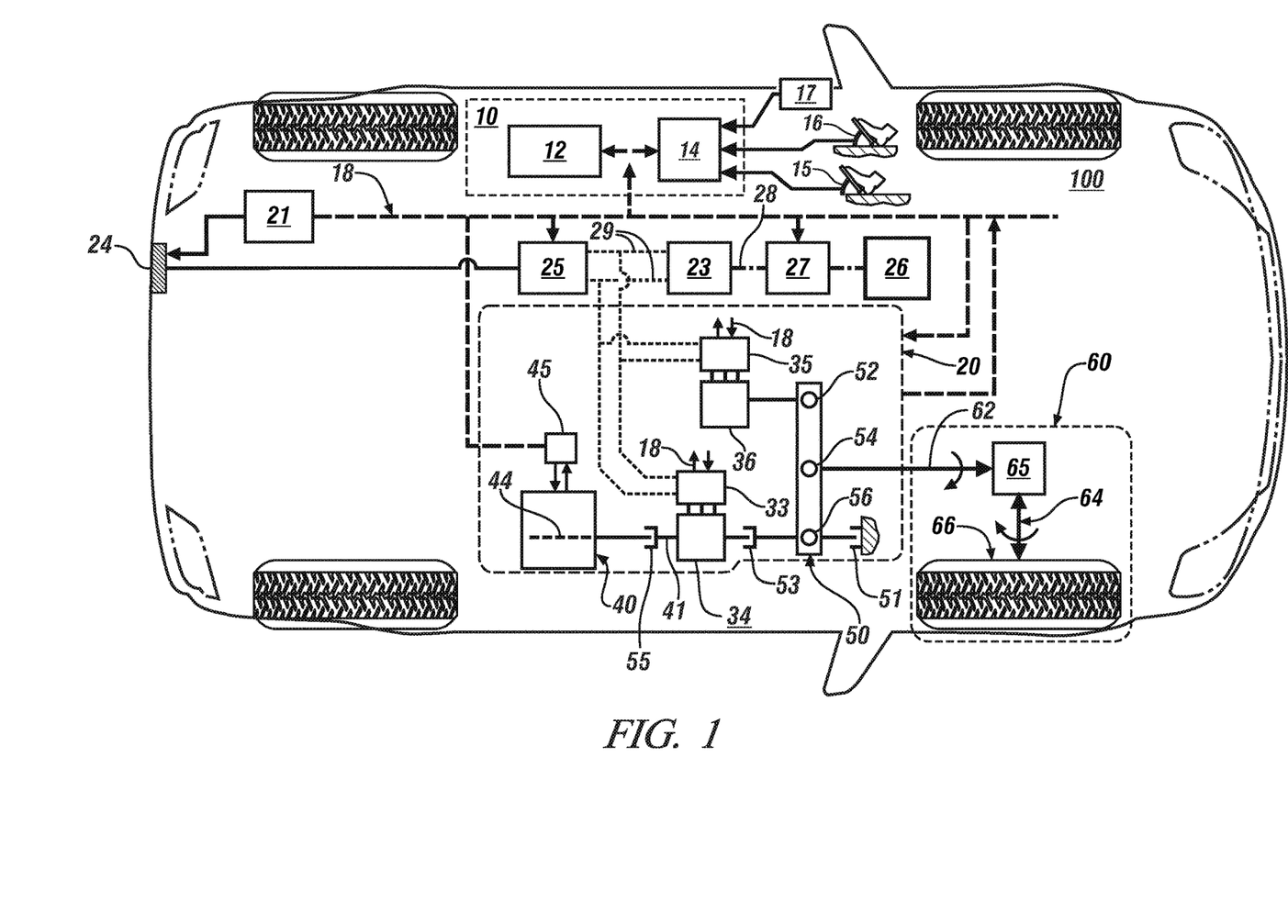
FIG. 1 schematically shows an embodiment of a vehicle capable of operating in an electric vehicle (EV) mode, including a powertrain system that includes a non-combustion torque machine coupled to a driveline, in accordance with the disclosure.

Referring now to the drawings, wherein the showings are for the purpose of illustrating certain exemplary embodiments only and not for the purpose of limiting the same, FIG. 1 schematically shows an embodiment of a vehicle 100 including a multi-mode powertrain system 20 coupled to a driveline 60 and controlled by a control system 10, wherein a rechargeable on-board high-voltage electrical energy storage device (DC power source) 25 supplies energy to generate at least a portion of the propulsion power. In certain embodiments, the DC power source 25 may electrically connect via an on-vehicle battery charger 24 to a remote, off-vehicle electric power source for charging while the vehicle 100 is stationary. Like numerals refer to like elements throughout the description. The concepts described herein apply to any vehicle powertrain system that includes a non-combustion torque machine that is operable to generate propulsion power. This includes, by way of non-limiting examples, plug-in hybrid vehicles, electric vehicles and non-plug-in hybrid vehicles. As used herein, the term "vehicle" refers to any mobile platform, and may include, by way of non-limiting examples, a passenger vehicle, a light-duty or heavy-duty truck, a utility vehicle, an agricultural vehicle, an industrial or warehouse vehicle, or a recreational off-road vehicle.

The illustrated powertrain system 20 includes multiple torque-generating devices including an internal combustion engine (engine) 40 and first and second electrically-powered torque machines (electric machines) 34, 36, respectively, that rotatably couple to a gear train 50. In one embodiment, the gear train 50 is a simple planetary gear set including a sun gear 52, a plurality of planet gears coupled to a carrier 54, and a ring gear 56. An output member 62 couples between the gear train 50 and a driveline 60. Thus, the engine 40 and the first and second electric machines 34, 36 couple to the gear train 50 and are controllable to generate propulsion power that is transferred to the driveline 60 as propulsion torque for the vehicle 100 in response to an acceleration request, or braking torque for the vehicle 100 in response to a braking request. The powertrain system 20 may operate in an electric vehicle (EV) mode, an electrically-variable transmission (EVT) mode, or a fixed-gear mode. When the powertrain system 20 is operating in the EV mode, propulsion power is generated by one or both the first and second electric machines 34, 36, and the engine 40 is in an OFF state.

One embodiment of the engine 40 and the first and second electric machines 34, 36 that couple to the gear train 50 and generate output torque that is transferred to the driveline 60 to generate propulsion torque is now described. A crankshaft 44 of the engine 40 couples to an input member 41 that couples to a rotor of the first electric machine 34 via a third clutch 55. In one embodiment and as shown an output member from the rotor of the first electric machine 34 couples via a second clutch 53 to the ring gear 56, the second electric machine 36 rotatably couples to the sun gear 52, and the planet gear carrier 54 couples via the output member 62 to the driveline 60. The ring gear 56 is couplable via a first clutch/brake 51 to a chassis ground. A transmission controller (TCM) monitors rotational speeds of various rotating members and controls activations of the first, second and third clutches 51, 53 and 55.

The engine 40 is preferably a multi-cylinder internal combustion engine that converts hydrocarbon-based fuel or another fuel to mechanical torque through a thermodynamic combustion process. The engine 40 is equipped with a plurality of actuators and sensing devices for monitoring operation and delivering fuel to form in-cylinder combustion charges that generate an expansion force that is transferred via pistons and connecting rods to the crankshaft 44 to produce torque. Operation of the engine 40 is controlled by an engine controller (ECM) 45. The engine 40 may be configured to execute autostart and autostop control routines, fuel cutoff (FCO) control routines and cylinder deactivation control routines during ongoing operation of the powertrain system 20. The engine 40 is considered to be in an OFF state when it is not rotating. The engine 40 is considered to be in an ON state when it is rotating, including one or more FCO states in which it is spinning and unfueled.

The first and second electric machines 34, 36 are preferably high-voltage multi-phase electric motor/generators that electrically connect to the DC power source 25 via first and second inverter modules 33, 35, respectively. The first and second electric machines 34, 36 are configured to convert stored electric energy to mechanical power and convert mechanical power to electric energy that may be stored in the DC power source 25. The DC power source 25 may be any high-voltage energy storage device, e.g., a multi-cell lithium ion device, an ultracapacitor, or another suitable device without limitation. The DC power source 25 may be characterized in terms of its energy capacity, e.g., state of charge (SOC), which may be expressed in terms of Amp-hours (Ah) or percentage of a maximum charge (%). Determination of energy capacity, e.g., SOC, for a battery or another energy storage device is known to those skilled in the art and not described in detail herein. In one embodiment, the DC power source 25 may electrically connect via the on-vehicle battery charger 24 to a remote, off-vehicle electric power source for charging while the vehicle 100 is stationary, with the on-vehicle battery charger 24 controlled by a charger controller 21. The DC power source 25 electrically connects to the first inverter module 33 via a high-voltage DC bus 29 to transfer high-voltage DC electric power to the first electric machine 34 in response to control signals originating in the control system 10. Likewise, the DC power source 25 electrically connects to the second inverter module 35 via the high-voltage DC bus 29 to transfer high-voltage DC electric power to the second electric machine 36 in response to control signals originating in the control system 10. The remote, off-vehicle electric power source may be any public/commercial power source or private power source, such as a residential power source.

Each of the first and second electric machines 34, 36 includes the rotor and a stator, and electrically connects to the DC power source 25 via the corresponding first and second inverter modules 33, 35, respectively, and the high-voltage DC bus 29. The first and second inverter modules 33, 35 are both configured with suitable control circuits including complementary paired switch devices in the form of power transistors, e.g., Insulated Gate Bipolar Transistors (IGBTs) for transforming high-voltage DC electric power to high-voltage AC electric power and transforming high-voltage AC electric power to high-voltage DC electric power. Alternatively, Field-Effect Transistors (FETs), MOS-FETs, or other power transistors may be employed.

The first and second inverter modules 33, 35 are preferably configured as voltage-source inverters (VSI) that may operate in either a pulsewidth-modulated (PWM) VSI mode or a six-step VSI mode to convert stored DC electric power originating in the DC power source 25 to AC electric power to drive the respective first and second electric machines 34, 36 to generate torque. Similarly, each of the first and second inverter modules 33, 35 converts mechanical power transferred to the respective first and second electric machines 34, 36 to DC electric power to generate electric energy that is storable in the DC power source 25, including as part of a regenerative power control strategy. The first and second inverter modules 33, 35 are both configured to receive motor control commands and control inverter states to provide the motor drive and regenerative braking operations through the first and second electric machine 34, 36. In one embodiment, a DC/DC electric power converter 23 electrically connects to a low-voltage bus 28 and a low-voltage battery 27, and electrically connects to the high-voltage DC bus 29. Such electric power connections are known and not described in detail. The low-voltage battery 27 electrically connects to an auxiliary power system 26 to provide low-voltage electric power to low-voltage systems on the vehicle, including, e.g., electric windows, HVAC fans, seats and other devices. Each of the first and second inverter modules 33, 35 may also include other electric circuit elements such as high-voltage DC link capacitors, resistors, and active DC bus discharge circuits.

The first and second inverter modules 33, 35 include gate drive modules. Each of the gate drive modules include a plurality of paired gate drive circuits, each which signally individually connects to one of the complementary paired switch devices of one of the phases of the respective one of the first and second inverter modules 33, 35. There are three paired gate drive circuits or a total of six gate drive circuits in each of the gate drive modules when the corresponding electric machine is a three-phase device. The gate drive modules receive operating commands from the controller 12 via communications bus 18 and control activation and deactivation of each of the switch devices via the gate drive circuits to provide motor drive or electric power generation functionality that is responsive to operating commands. During operation, each of the gate drive modules generates a pulse in response to a control signal originating from the controller 12, which activates one of the switch devices and induces current flow through a half-phase of the respective electric machine. The first and second gate drive modules operate to periodically and repetitively sequentially activate the complementary paired switch devices to transfer electric power between one of the positive and negative rails of the high-voltage DC power bus 29 and a plurality of windings associated with one of the phases of the corresponding first and second torque machine 34, 36 to transform electric power to mechanical torque, or to transform mechanical torque to electric power.

The driveline 60 may include a differential gear device 65 that mechanically couples to an axle, transaxle or half-shaft 64 that mechanically couples to a wheel 66 in one embodiment. The driveline 60 transfers propulsion torque between the gear train 50 and a road surface.

An operator interface 14 of the vehicle 100 includes a controller that signally connects to a plurality of human/machine interface devices through which the operator commands operation of the vehicle 100. The human/machine interface devices preferably include, e.g., an accelerator pedal 15, a brake pedal 16 and a user interface such as a graphical user interface (UI) 17. Other human/machine interface devices may include an ignition switch to enable an operator to operate the vehicle 100, a steering wheel, a transmission range selector and a headlamp switch. The accelerator pedal 15 provides signal input indicating an accelerator pedal position and the brake pedal 16 provides signal input indicating a brake pedal position. The accelerator pedal position corresponds to an operator request for acceleration in the form of propulsion torque, which may be generated by controlling operation of one or more of the first and second electric machines 34, 36 and the engine 40. The brake pedal position corresponds to an operator request for braking torque, which may be generated by controlling operation of one of the first and second electric machines 34, 36 and the wheel brakes. In certain embodiments, a navigation system with on-vehicle GPS is employed on the vehicle 100.

The control system 10 includes a controller 12 that signally connects to the operator interface 14. The controller 12 preferably includes a plurality of discrete devices that are co-located with the individual elements of the powertrain system 20 to effect operational control of the individual elements of the powertrain system 20 in response to operator commands and powertrain demands. The controller 12 may also include a control device that provides hierarchical control of other control devices. The controller 12 communicatively connects to each of the DC power source 25, the first and second inverter modules 33, 35, the ECM 45, and the TCM, either directly or via a communication bus 18 to monitor and control operation thereof. The controller 12 commands operation of the powertrain system 20, including selecting and commanding operation in one of a plurality of operating modes to generate and transfer torque between the torque generative devices, e.g., the engine 40 and the first and second electric machines 34, 36 and the driveline 60.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, for example each 100 microseconds or 3.125, 6.25, 12.5, 25 and 100 milliseconds during ongoing operation. Alternatively, routines may be executed in response to occurrence of a triggering event.

The powertrain system 20 communicates sensor signals and actuator command signals between the control system 10, the vehicle 100 and the powertrain system 20 employing one or more communication systems and devices, including, e.g., the communication bus 18, a direct connection, a local area network bus, a serial peripheral interface bus, and/or a wireless link to effect information transfer. Communication between controllers and between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
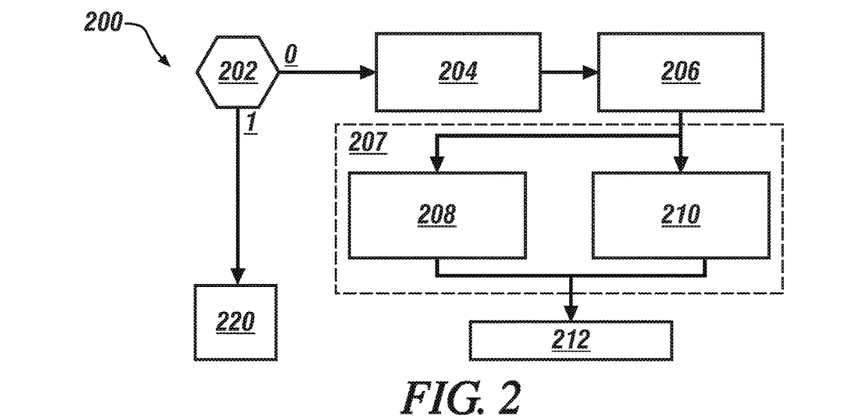
FIG. 2 schematically shows an electric vehicle audible tone injection routine that may be executed to control operation of an embodiment of a vehicle capable of operating in an EV mode, in accordance with the disclosure.

FIG. 2 schematically shows an electric vehicle audible tone generation routine (routine) 200 that may be executed to control operation of an embodiment of a vehicle capable of operating in an EV mode. One embodiment of such a vehicle is vehicle 100 that is described with reference to FIG. 1. This routine 200 may be advantageously employed on various vehicle systems that operate in an EV mode and employ high-voltage electrical systems to generate propulsion torque. Table 1 is provided as a key wherein the numerically labeled blocks and the corresponding functions are set forth as follows, corresponding to the routine 200.

TABLE 1

| BLOCK | BLOCK CONTENTS |
|---|---|
| 202 | Is powertrain operating in EV Mode? AND Is vehicle speed between an upper threshold speed and a lower threshold speed? |
| 204 | Determine vehicle speed |
| 206 | Determine a target sound associated with a preferred audible sound to be generated by the powertrain system based upon the vehicle speed |
| 207 | Incorporate target sound into control of electric machine(s) |
| 208 | Determine inverter PWM frequencies that are responsive to operating in the EV mode to dither motor operation to create an overall baseline broadband sound that is associated with the preferred audible sound |
| 210 | Determine current control and amount of current ripple that induce a desired frequency that generates the preferred audible sound |
| 212 | Verify operation |
| 220 | End execution |

During vehicle operation, the routine 200 periodically monitors operation, including determining the powertrain operating mode and monitoring vehicle speed. When the powertrain operating mode includes operating with the engine in the ON state, or when the vehicle is operating at a speed that is greater than an upper threshold speed, e.g., when the vehicle speed is greater than 20 km/h, or when the vehicle speed is less than a lower threshold speed, e.g., when the vehicle speed is less than 4 km/h, (202)(1), the present iteration of the routine 200 ends execution without further action (220).

When the powertrain operating mode is an EV mode, e.g., when the engine is in the OFF state, and the vehicle is operating at a speed that is between the upper and lower threshold speeds (202)(0), the routine 200 undertakes operation to control operation of one or more of the electric machines 34, 36 in a manner that generates an audible tone. This includes determining the vehicle speed (204) and determining a preferred audible sound that is to be generated by the powertrain system at the vehicle speed (206). The preferred audible sound may be described in the form of a target sound, which is in the form of a complex acoustic tone that includes an audible sound that is composed from a plurality of simultaneously generated tone contributions at multiple frequencies. The complex acoustic tone may be expressed graphically and indicated as power or pressure in decibels (db) in relation to sound frequency (Hz). For purpose of this disclosure, the audible range of frequencies includes frequencies from 20 Hz to 20 kHz. In certain embodiments, the preferred audible sound is vehicle speed-dependent. A lookup table may be precalibrated that provides a plurality of preferred target sounds, wherein a vehicle speed or speed range has a unique target sound associated therewith. The lookup table may be stored in a memory device of one of the controllers and may be interrogated by the routine 200. Alternatively, the target sound may be generated by an executable algorithm or formula that determines the preferred audible sound in relation to vehicle speed.

The preferred audible sound is incorporated into control of the electric machine(s), as follows (207). The preferred audible sound may be achieved as a part of executing control of one or both of the first and second electric machines 34, 36 to generate propulsion torque that is responsive to the output torque request at the present vehicle speed. This may include determining one or more inverter PWM frequencies to dither operation to create an overall baseline broadband sound (208) and determining current controls and an amount of current ripple that induce a desired instantaneous frequency to generate a complex acoustic tone associated with the preferred audible sound for the present vehicle speed (210).

Executing dithering of the PWM control frequency to achieve a broadband base noise and executing current injection to induce current ripple to achieve pitch shifting tone that is dependent upon the vehicle speed preferably induces the preferred audible sound in operation of the first and second electric machines 34, 36. The operation of the first and second electric machines 34, 36 may be monitored to verify that the desired operation is achieved (212).

Figure 3:
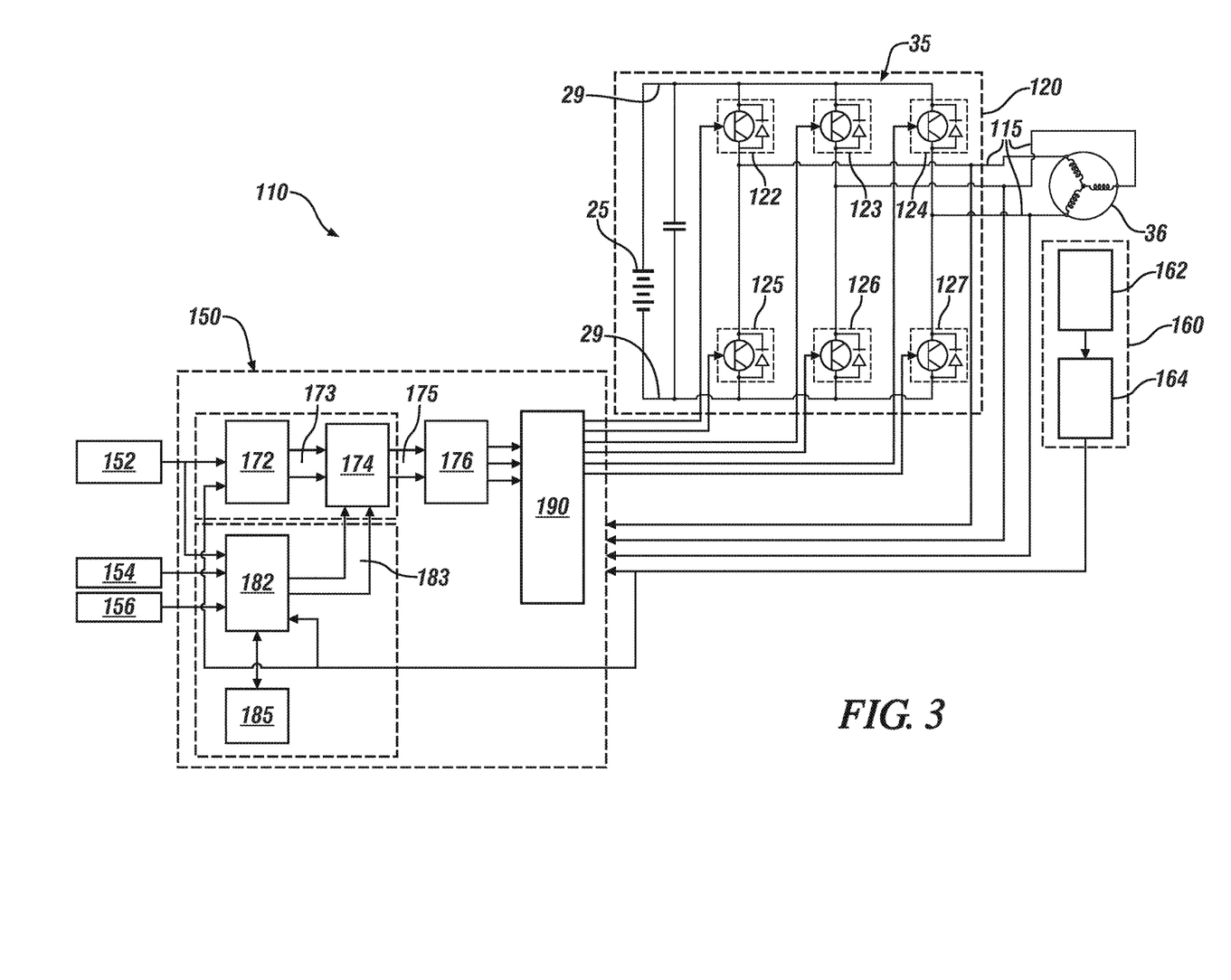
FIG. 3 schematically shows, with continued reference to FIG. 1, an electric motor control system of an inverter module for controlling an embodiment of a vehicle capable of operating in an EV mode, in accordance with the disclosure.

FIG. 3 schematically shows, with continued reference to FIG. 1, an electric motor control system 110 of the second inverter module 35 for controlling the second electric machine 36, which may include executing motor dithering to achieve a broadband base noise and executing current injection to achieve pitch shifting tone that is preferably dependent upon the vehicle speed. The electric motor control system 110 may be executed as hardware components, integrated circuits, software control routines and/or other elements that are disposed in the second inverter module 35 in certain embodiments. Alternatively, certain elements of the electric motor control system 110 may be disposed elsewhere in the vehicle 100. The electric motor control system 110 includes a controller 150 and an inverter 120. Signal inputs to the controller 150 include the operator requests for propulsion torque and braking torque 152, the present vehicle speed 154, the engine state 156, which may be either ON or OFF, a rotational speed of the electric machine 36, and current signals from each phase 115 of the electric machine 36.

As shown, the inverter 120 is disposed to provide electric control for the electric machine 36, and is connected between direct current (DC) bus lines 29 of the DC power source 25. The inverter 120 includes switches 122, 123, 124, 125, 126, 127, wherein each of the switches includes a transistor such as an IGBT that is connected in parallel with an antiparallel diode. The switches 122, 123, 124, 125, 126, 127 operate in response to signals from the controller 150 supplied to gates of the transistors thereof to provide voltage to each phase 115 of the electric machine 36. Each of the switch pairs 122/125, 123/126 and 124/127 forms a phase leg of the inverter 120.

A speed detection circuit 160 measures the rotor position and speed of the electric machine 36 and includes a resolver 162 or other speed sensing device that is coupled to the electric machine 36 to detect rotational position of a rotor of the electric machine 36 and, thereby determine a speed of the electric machine 36. The speed detection circuit 160 may also include a resolver-to-digital converter 164 or another analytical scheme that converts the signals from the resolver 162 to digital signals (e.g., a digital motor speed signal and a digital rotor angular position signal). The resolver-to-digital converter 164 provides the digital representations of angular position and speed of the rotor of the electric machine 36 to the controller 150.

The controller 150 includes a first torque command module 172 that generates commanded voltages 173 in response to operator requests for propulsion torque and braking torque, taking into account rotational speed of the electric machine 36 and current signals from each phase 115 of the electric machine 36. This may include employing Park's transformation from three-phase to a rotating dq coordinate system to generate direct-current Cartesian commanded voltages, which includes a d-axis synchronous frame commanded voltage and a q-axis synchronous frame commanded voltage.

The controller 150 includes a second torque command module 182 that generates second commanded voltages 183 that may be added to corresponding ones of the first commanded voltages 173 in a summer 174, which provides final commanded voltages 175. The final commanded voltages 175 are presented to a transformation module 176 to generate three-phase voltage commands, which are employed in a transformation module 190 to generate control commands for the switches 122, 123, 124, 125, 126, 127. The second torque command module 182 is configured to generate the second commanded voltages 183 only when the vehicle speed 154 is less than a threshold speed, e.g., 20 km/hr, and when the engine state 156 is OFF, indicating the vehicle is operating in an EV mode. The second torque command module 182 interrogates a sound spectrum calibration table 185, which provides a vehicle speed-specific predetermined motor torque command, preferably in the rotating dq coordinate system, that causes the second electric machine 36 to generate the complex acoustic tone that is associated with the preferred audible sound.

As such, when the second torque command module 182 is activated, the controller 150 combines the first commanded voltages 173 and the second commanded voltages 183 using the summer 174 to determine the final commanded voltages 175. The final commanded voltages 175 are presented to the transformation module 176 to generate three-phase voltage commands, which are employed in the transformation module 190 to generate control commands for the switches 122, 123, 124, 125, 126, 127. Operation of the second electric machine 36 in response to the control commands for the switches 122, 123, 124, 125, 126, 127 causes the second electric machine 36 to operate in a manner that generates the preferred audible sound associated with the sound spectrum calibration table 185.

The sound spectrum calibration table 185 includes a plurality of vehicle speed-dependent target sounds. A lookup table may be precalibrated that provides the plurality of target sounds, wherein a vehicle speed or speed range has a unique target sound associated therewith. The lookup table may be stored in a memory device of one of the controllers and may be interrogated by the routine 200.

The second commanded voltages 183 provide operational control signals that are designed to inject current into the stator to generate acoustic noise in the electric machine that corresponds to a preferred harmonic that is associated with the preferred audible sound.

Figure 41:
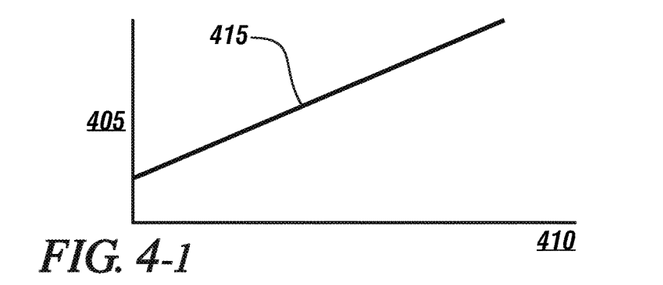

FIG. 4-1 graphically shows an example of characteristic operation of an electric motor supplying propulsion torque on a vehicle, including a PWM switching frequency 405 for control of the electric motor on the vertical axis in relation to vehicle speed 410 on the horizontal axis. A positive linear relationship 415 is shown, and indicates that the PWM switching frequency 405 increases linearly to achieve an increase in the vehicle speed 410.

Figure 42:
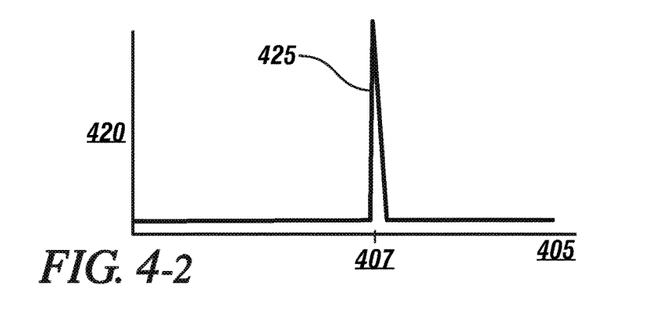

FIG. 4-2 graphically shows characteristic operation of the electric motor of FIG. 4-1 in context of a select switching frequency and an associated sound pressure level (SPL), with PWM switching frequency 405 shown on the horizontal axis and SPL 420 shown on the vertical axis. SPL 420 is a logarithmic measure of the effective pressure of a sound relative to a reference value, and may be measured in decibels (dB). As indicated, the SPL 420 is at a maximum peak intensity 425 at a selected PWM switching frequency 407, and is at or near zero at other PWM switching frequencies 405.

Figure 43:
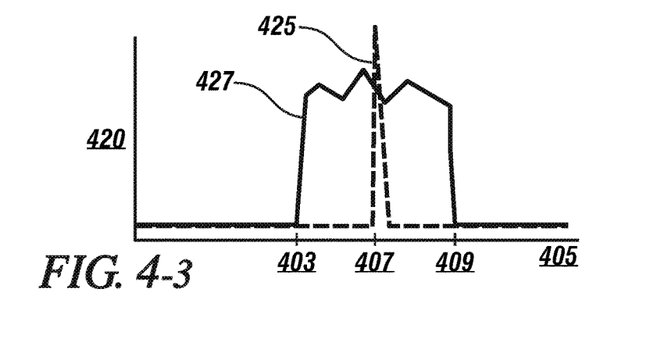

FIG. 4-3 graphically shows characteristic operation of the electric motor of FIG. 4-1 in context of a select switching frequency and an associated sound pressure level (SPL), with PWM switching frequency 405 shown on the horizontal axis and SPL 420 shown on the vertical axis, wherein dithering of the PWM switching frequency 405 is applied to achieve a target sound 427. The dithering includes a frequency range between a lower PWM switching frequency 403 and an upper PWM switching frequency 409, preferably about the selected switch frequency 407. As indicated, a target sound 427 having a broadband sound spectrum is generated, with the SPL for the target sound 427 at or near a peak intensity over the frequency range between the lower and upper PWM switching frequencies 403, 409. Dithering is an intentionally applied form of noise that is employed to randomize quantization errors and smear tones into white noise, thus preventing large-scale sound patterns such as may be shown by the peak intensity 425. The target sound 427 may be generated by applying dithering to the selected switch frequency 407 and injecting current. The target sound 427 is associated with operation of an electric machine on a vehicle, e.g., as described with reference to the electric vehicle audible tone generation routine 200 shown in FIG. 2.

The concepts described herein enable using electric machines to generate powertrain sounds, including using tonal and random ripple current injection strategies to make desired broadband and tonal sounds. Existing on-vehicle controllers may be employed to control and affect motor noise. This may include characterizing a sound profile of an electric machine based on current injection, and developing calibrations to tune motor control to generate the required desired tone strength at different frequencies. In certain embodiments, a broadband base noise in conjunction with a pitch shifting tone that changes in frequency with vehicle speed is accomplished by executing motor dithering to achieve the broadband base noise and executing current injection to achieve pitch shifting tone.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instructions to implement the function or act specified in the flowchart.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a vehicle powertrain system including an electric machine electrically connected to a power inverter, wherein the vehicle powertrain system is operative in an electric vehicle mode to generate propulsion torque, the method comprising:
   determining a vehicle speed, and determining a preferred audible sound to be generated by the vehicle powertrain system when operating in the electric vehicle mode at the vehicle speed;
   determining a control signal for the power inverter associated with operating the vehicle powertrain system in the electric vehicle mode at the vehicle speed;
   incorporating the preferred audible sound into the control signal for the power inverter, including injecting a current ripple to induce a desired instantaneous frequency to generate a complex acoustic tone in the electric machine that is associated with the preferred audible sound, including injecting the current ripple into a direct (D)-axis current for a stator winding of the electric machine, wherein the D-axis current is associated with the control signal for the power inverter; and
   controlling the power inverter to operate the electric machine employing the control signal and the preferred audible sound.

2. The method of claim 1, wherein incorporating the preferred audible sound into the control signal for the power inverter comprises dithering operation of the electric machine at a power inverter frequency in response to the preferred audible sound.

3. The method of claim 1, wherein the preferred audible sound comprises a complex acoustic tone that is composed from a plurality of simultaneously generated tone contributions at multiple frequencies.

4. The method of claim 1, wherein the preferred audible sound varies with the vehicle speed.

5. A method for controlling a power inverter electrically connected to a non-combustion torque machine disposed to generate propulsion torque in a vehicle, the method comprising:
    determining a vehicle speed;
    determining a preferred audible sound when operating at the vehicle speed;
    determining a control signal for the power inverter associated with operating at the vehicle speed;
    incorporating the preferred audible sound into the control signal for the power Inverter, including injecting a current ripple to induce a desired instantaneous frequency to generate a complex acoustic tone in the electric machine that is associated with the preferred audible sound, including injecting the current ripple into a direct (D)-axis current for a stator winding of the electric machine, wherein the D-axis current is associated with the control signal for the power inverter; and
    controlling the power inverter to operate the electric machine employing the control signal and the preferred audible sound.

6. The method of claim 5, wherein incorporating the preferred audible sound into the control signal for the power inverter comprises dithering operation of the electric machine at a power inverter frequency in response to the preferred audible sound.

7. The method of claim 5, wherein the preferred audible sound comprises a complex acoustic tone that is composed from a plurality of simultaneously generated tone contributions at multiple frequencies.

8. The method of claim 5, wherein the preferred audible sound is vehicle speed-dependent.

9. A powertrain system coupled to a driveline of a vehicle, comprising:
    an electric machine electrically connected to a power inverter module that is electrically connected to a direct current (DC) power source, wherein the electric machine is rotatably coupled to the driveline; and
    a controller operatively connected to the power inverter module, wherein the controller includes an instruction set, the instruction set executable to:
        control the power inverter module to control the powertrain system in an electric vehicle mode to generate propulsion torque that is transferable to the driveline,
    determine a vehicle speed, and determine a preferred audible sound to be generated by the powertrain system when operating in the electric vehicle mode at the vehicle speed,
        determine a control signal for the power inverter module associated with operating the powertrain system at the vehicle speed,
        incorporate the preferred audible sound into the control signal for the power inverter module, including injecting a current ripple to induce a desired instantaneous frequency to generate a complex acoustic tone in the electric machine that is associated with the preferred audible sound, including injecting the current ripple into a direct (D)-axis current for a stator winding of the electric machine, wherein the D-axis current is associated with the control signal for the power inverter, and
        control the power inverter nodule to operate the electric machine employing the control signal and the preferred audible sound.

10. The powertrain system of claim 9, wherein the instruction set executable to incorporate the preferred audible sound into the control signal for the power inverter comprises the instruction set executable to dither operation of the electric machine at a power inverter frequency in response to the preferred audible sound.

11. The powertrain system of claim 9, wherein the preferred audible sound comprises a complex acoustic tone that is composed from a plurality of simultaneously generated tone contributions at multiple frequencies.

\* \* \* \* \*